United States Patent
Ponnangath

(10) Patent No.: US 8,494,478 B1
(45) Date of Patent: Jul. 23, 2013

(54) MOBILE PHONE AS COMPUTER BACKUP INCLUDING POWER MANAGEMENT

(75) Inventor: Sunil K. Ponnangath, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1280 days.

(21) Appl. No.: 11/943,030

(22) Filed: Nov. 20, 2007

(51) Int. Cl.
*H04B 1/16* (2006.01)

(52) U.S. Cl.
USPC ....... 455/343.2; 455/411; 455/466; 455/41.2; 455/418; 455/420; 455/343.1; 455/343.3; 455/343.4; 455/343.6

(58) Field of Classification Search
USPC ............. 455/426.2, 343.1–343.6, 419, 411, 455/466, 426, 41.2, 418, 420, 573, 404.1
See application file for complete search history.

(56) References Cited

U.S. PATENT DOCUMENTS

| 7,401,194 B2* | 7/2008 | Jewell ........................... 711/162 |
| 2007/0207729 A1* | 9/2007 | Chen et al. ...................... 455/15 |
| 2008/0263375 A1* | 10/2008 | Sundstrom et al. ........... 713/320 |

FOREIGN PATENT DOCUMENTS

| WO | WO 2004/114639 A1 * | 12/2004 |
| WO | WO 2006125961 A1 * | 11/2006 |

* cited by examiner

*Primary Examiner* — Manpreet Matharu

(57) ABSTRACT

A data backup system is provided. The system comprises a first device configured to identify a data to transmit and to transmit the data at a selected time, wherein the data is stored on the first device. The system also comprises a mobile phone in communication with the first device, wherein the mobile phone is configured to receive the data from the first device, to store the data in a memory of the mobile phone, and to transmit the data. The system further comprises a backup server in communication with the mobile phone configured to receive the data from the mobile phone, wherein the memory of the mobile phone is freed after transmitting the data to the backup server.

20 Claims, 8 Drawing Sheets

MOBILE PHONE AS COMPUTER BACKUP INCLUDING POWER MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order for data on a computer to be backed up to a remote location a network connection may be necessary. If the computer has no network connectivity, the computer may store the data on its hard drive until it is able to establish network connectivity. Thus, if the computer is unable to establish network connectivity and the hard drive of the computer were to fail, data could be lost because the data was not backed up to a remote location.

SUMMARY

In one embodiment, the disclosure includes a data backup system. The system comprises a first device configured to identify a data to transmit and to transmit the data at a selected time, wherein the data is stored on the first device. The system also comprises a mobile phone in communication with the first device, wherein the mobile phone is configured to receive the data from the first device, to store the data in a memory of the mobile phone, and to transmit the data. The system further comprises a backup server in communication with the mobile phone configured to receive the data from the mobile phone, wherein the memory of the mobile phone is freed after transmitting the data to the backup server.

In another embodiment, the disclosure includes a method of backing up data. The method comprises identifying a data to be backed-up; receiving a backup status indication, wherein the backup status indication is based on a remaining battery power of a mobile phone; scheduling a time to transmit the data based on at least the backup status indication; and transmitting the data at the scheduled time to the mobile phone.

In yet another embodiment, the disclosure includes a system of backing up data. The system comprises a mobile phone configured to receive a backup data from a data source outside the mobile phone, to store the backup data in a memory of the mobile phone, and to transmit an indication of battery power level of the mobile phone to the data source.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In order for data on a computer to be backed up to a remote location a network connection is typically needed. However, there are times when a computer has no network connectivity and thus may only store the data on the hard drive of the computer. If the hard drive were to fail when the data had not been backed up, data could be lost.

Sometimes, for example while in a business meeting, a computer may lack network connectivity and thus may be unable to backup data to a remote location. Because computer users commonly carry a mobile phone today, the mobile phone may provide a means to backup data stored on the computer to a remote location.

The disclosure relates to providing a system and a method for backing up data. The data to be backed up on the computer is identified. The data is then transmitted to a mobile phone where it is stored. The data may be transmitted on demand or periodically. The mobile phone then may transmit the data to a backup server when a network connection is available. Upon transmitting the data to the backup server, the memory of the mobile phone is freed. In an embodiment, the mobile phone may provide limited data backup capability without having network connectivity. In some embodiments, the mobile phone may send a backup status indication to the computer indicating the remaining battery power on the mobile phone. Thresholds may be specified based on the backup status indication such that as the remaining battery power on the mobile phone decreases and reaches certain thresholds, the level of backup activity decreases, thus conserving the battery power of the mobile phone and promoting effective phone battery power management. For example, a threshold may be specified such that when the backup status indication reaches that particular threshold, a different variation of data is transmitted. In another example, a threshold may be specified such that when the backup status indication reaches that particular threshold, the period of time between transmissions increases.

Figure 1:
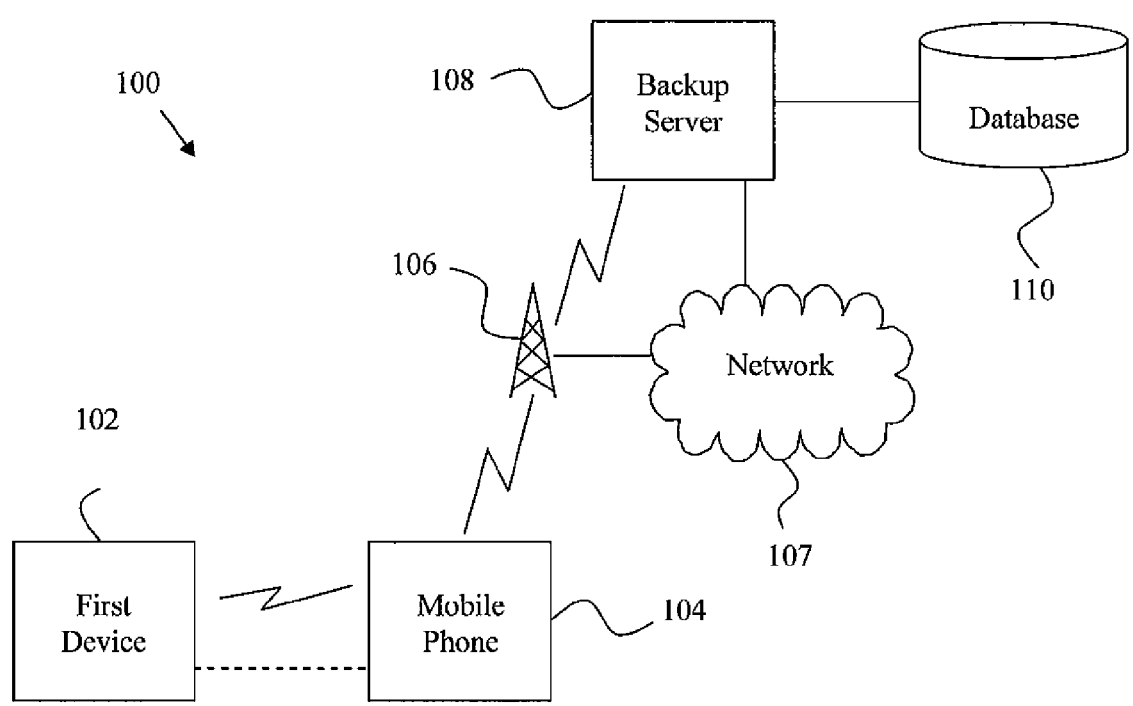
FIG. 1 is a block diagram of a system according to an embodiment of the disclosure.

Turning to FIG. 1, a data backup system 100 comprises a first device 102, a mobile phone 104, a wireless base station 106, a network 107, a backup server 108, and a database 110. The first device 102 may be, for example, any general-purpose computer, as discussed in greater detail hereinafter. In an embodiment, the first device 102 may be a laptop computer or a tablet computer. The first device 102 is in communication with the mobile phone 104 via a Bluetooth or other wireless or wired link. The data that is to be backed up is identified and the first device 102 transmits the data to the mobile phone 104. The data may be transmitted to the mobile phone 104, for example, on demand or periodically. In an embodiment, the data that is to be backed up is organized in order of priority such that the first device 102 sends the data to the mobile phone 104 in order of priority.

The mobile phone 104 may be, for example, any cellular phone or personal data assistant (PDA). A handset suitable for some embodiments of the mobile phone 104 is described in more detail hereinafter. The mobile phone 104 receives the data from the first device 102 and stores the data in the memory of the mobile phone 104. In an embodiment, the mobile phone 104 receives the data from the first device 102 in order of priority. The mobile phone 104 is able to communicate with the backup server 108 via the wireless base station 106 or via the network 107, when the mobile phone 104 has access to the wireless base station 106. The mobile phone 104 then transmits the data to the backup server 108. In an embodiment, the mobile phone 104 is capable of determining the change in the data received from the first device 102, storing the changed data, and then sending the changed data to the backup server 108. This may be referred to as transmitting deltas. In another embodiment, the first device 102 determines the change in the data and the mobile phone 104 receives the changed data and sends the changed data to the backup server 108. This may also be referred to as transmitting deltas. In another embodiment, backups may include complete files instead of deltas.

Upon transmitting the changed data to the backup server 108, the memory of the mobile phone 104 that was used to store the backup data may be freed. In an embodiment, the memory of the mobile phone 104 is freed on the fly. In other words, as the mobile phone 104 transmits each of the plurality of deltas or files in one or more transmissions, the appropriate portion of the memory of the mobile phone 104 is freed. In another embodiment, the appropriate portion of the memory of the mobile phone 104 is freed some time after the mobile phone 104 transmits all the data to the backup server 108.

The mobile phone 104 also transmits a backup status indication or an indication of battery power level of the mobile phone 104 to the first device 102. In an embodiment, the first device 102 may not transmit the data to the mobile phone 104 until the first device 102 receives the indication of battery power level of the mobile phone 104. In another embodiment, the first device 102 may transmit the data periodically with different periods of time between backups depending on the indication of battery power level of the mobile phone 104. For example, at an indication of a higher battery power level of the mobile phone 104, the first device 102 may transmit the data at more frequent intervals between backups, whereas at an indication of a lower battery power level of the mobile phone 104, the first device 102 may transmit the data at less frequent intervals between backups. This may prolong the battery life of the mobile phone 104 by reducing the amount of activity as the battery power level dwindles. In yet another embodiment, the first device 102 may transmit variations of the data, for example, transmitting the data in order of priority or transmitting only the first priority data, depending on the indication of battery power level of the mobile phone 104. In a further embodiment, when the indication of battery power level of the mobile phone 104 reaches a certain level, the first device 102 may stop transmitting the data to the mobile phone 104 and may cease the backup of the data until the battery of the mobile phone 104 is recharged. The first device 102 may provide notification, for example, a pop-up text window in a graphical user interface (GUI) stating that the mobile phone 104 battery is low or other status information. In an embodiment, the first device 102 may change from full-backups to deltas at an indication of lower battery power of the mobile phone 104. In an embodiment, the first device 102 may change to send deltas on some files and full-backups on other files at an indiction of lower battery power of the mobile phone 104. In an embodiment, the first device 102 may change to transmitting only deltas of high priority files at an indication of lower battery power of the mobile phone 104. A combination of these approaches may be applied according to a range of indications of the battery power of the mobile phone 104.

The wireless base station 106 may be any cellular wireless base station known to those skilled in the art, for example, a Code Division Multiple Access (CDMA) cellular wireless base station, a Global System for Mobile Communications (GSM) cellular wireless base station, a Universal Mobile Telecommunications System (UMTS) cellular wireless base station, a World-wide Interoperable Microwave Access (WiMAX) base station, a WiFi access point, or other wireless access device. The wireless base station 106 is in communication with the network 107, for example, through wired communication links. The wireless base station 106 is in communication with the backup server 108 through wired or wireless communications.

The network 107 is a communications network comprising various wired and wireless technologies well known to those skilled in the art. The network 107 may supply a variety of communications services and communication content.

The backup server 108 may be any general-purpose computer system, as discussed in greater detail hereinafter. The backup server 108 may comprise a single computer or a plurality of computers provided at different places, for example, to provide geographical diversity. The backup server 108 receives the changed data from the mobile phone 104 via the wireless base station 106 or via the network 107. In an embodiment, the backup server 108 transmits the changed data to the database 110 to be stored. The backup server 108 executes one or more applications that provide the changed data to the first device 102 when requested by the first device 102.

The database 110 stores the changed data and makes the changed data available to the backup server 108. The database 110 may be one or more databases. The backup server 108 communicates with the database 110 through any of a variety of communications means.

Figure 2:
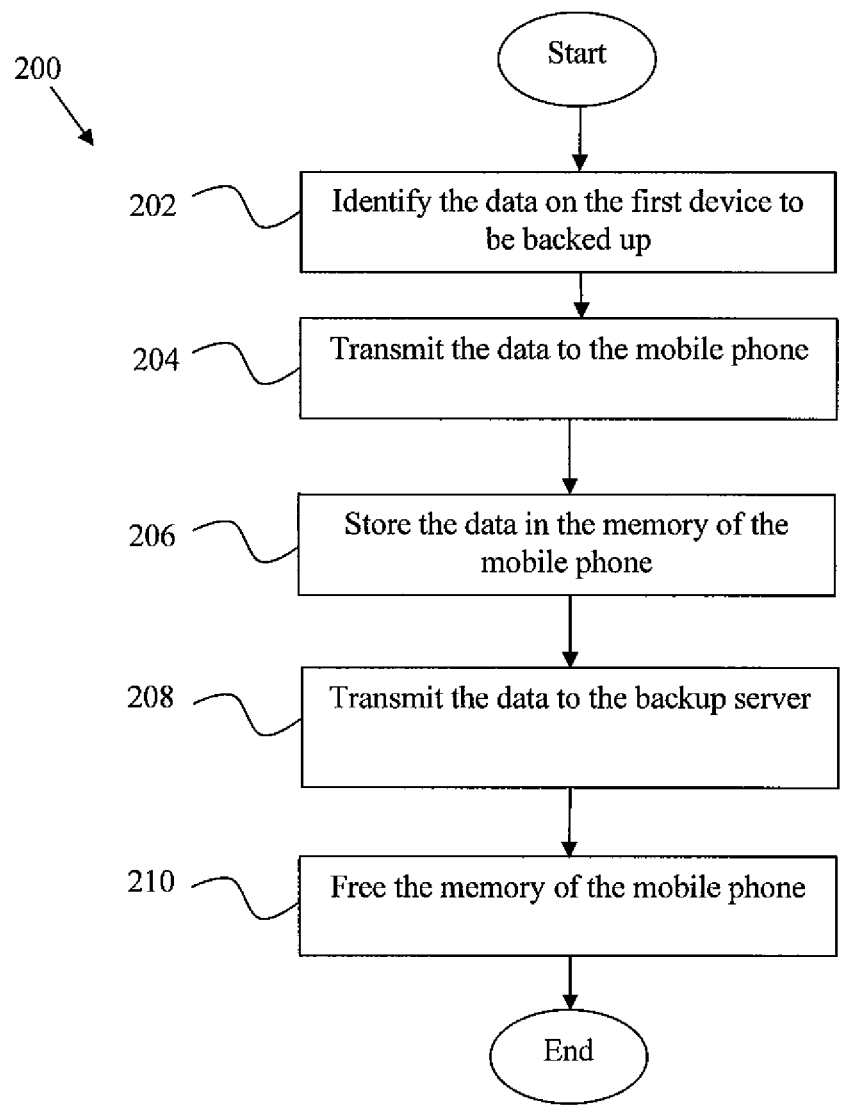
FIG. 2 is a flow chart illustrating a method according to an embodiment of the disclosure.

FIG. 2 illustrates a method 200 of backing up data if the mobile phone 104 has connectivity to the mobile phone access network, for example, connectivity to the wireless base station 106, in accordance with embodiments of the disclosure. The method 200 begins at block 202 where the data on the first device 102 to be backed up is identified. In an embodiment, the data on the first device 102 to be backed up may be organized in order of priority. At block 204, the data is transmitted to the mobile phone 104 via a Bluetooth or other wireless or wired link. In an embodiment, the data is transmitted to the mobile phone 104 on demand, for example, by hitting the save button on the first device 102. In another embodiment, the data is transmitted to the mobile phone 104 periodically, for example, every twenty minutes. In yet another embodiment, instead of updating on some periodic basis, the data may be transmitted after a sufficiently large change or significant changes have been made to the selected data. In an embodiment, the data may be transmitted to the mobile phone 104 in order of priority. At block 206, the data is stored in the memory of the mobile phone 104. At block 208, the data is transmitted from the mobile phone 104 to the backup server 108. In an embodiment, the mobile phone 104 may wait until connectivity with a mobile phone access network, such as via the wireless base station 106, is available to transmit the data. In another embodiment, the data may be transmitted from the backup server 108 to a database 110 to be stored. At block 210, the memory used to store the backup data on the mobile phone 104 may be freed.

Figure 3:
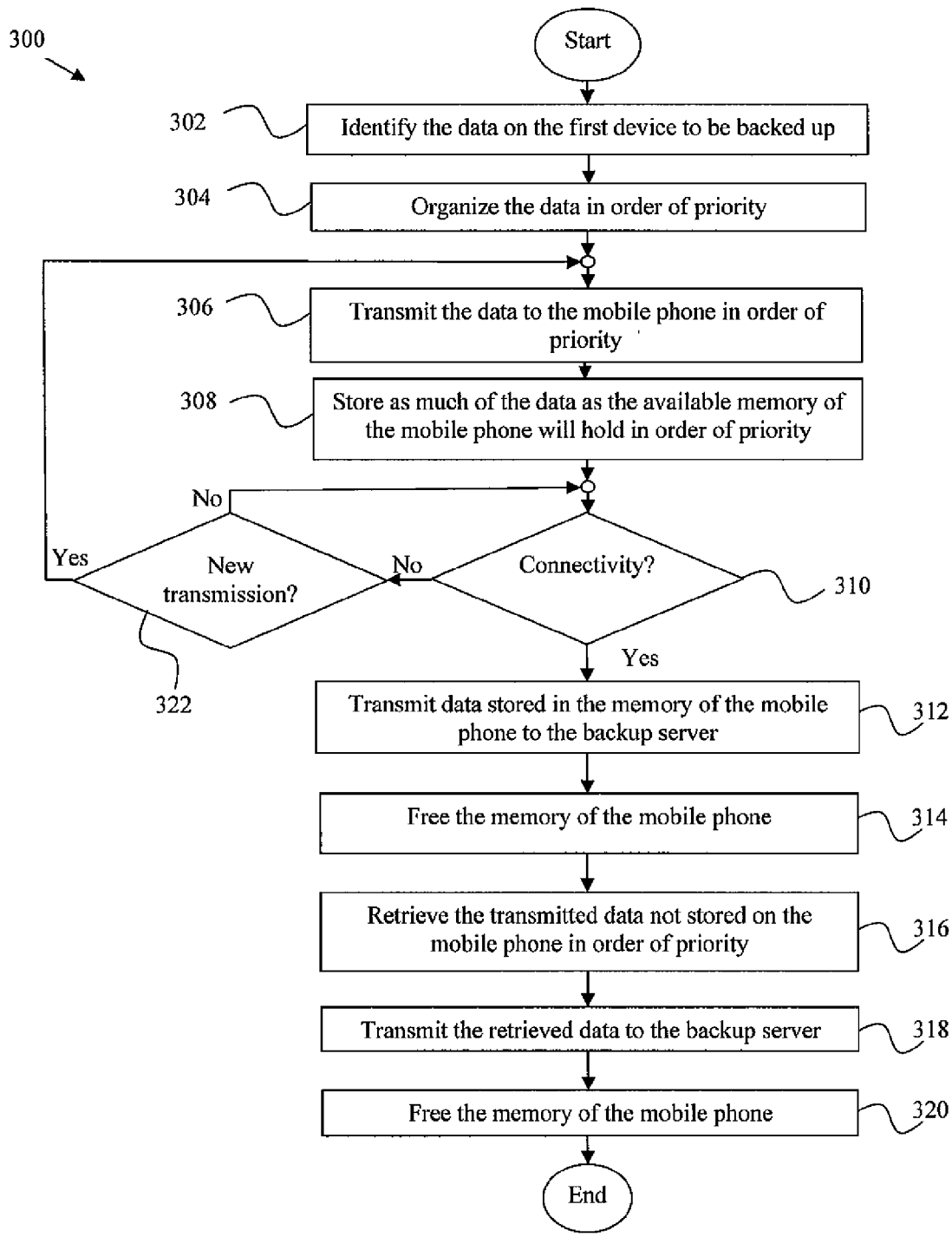
FIG. 3 is a flow chart illustrating a method according to another embodiment of the disclosure.

FIG. 3 illustrates a method 300 of backing up data if the mobile phone 104 lacks connectivity, in accordance with embodiments of the disclosure. The method 300 begins at block 302 where the data on the first device 102 to be backed up is identified. At block 304, the data is organized in order of priority. At block 306, the data is transmitted to the mobile phone 104 in order of priority via a Bluetooth or other wireless or wired link. In an embodiment, the data is transmitted to the mobile phone 104 on demand, for example, by hitting the save button on the first device 102. In another embodiment, the data is transmitted to the mobile phone 104 periodically, for example, every thirty minutes. At block 308, the memory of the mobile phone 104 stores as much of the data in order of priority as the available memory of the mobile phone 104 will hold.

At block 310, if the mobile phone 104 has connectivity to the mobile phone access network, the method proceeds to block 312. At block 312, the mobile phone 104 transmits the data stored in the memory of the mobile phone 104 to the backup server 108. At block 314, the memory used to store the backup data on the mobile phone 104 is freed. At block 316, the mobile phone 104 retrieves the transmitted data that was unable to be stored in the memory of the mobile phone 104 from the first device 102 in order of priority. In an embodiment, the mobile phone 104 keeps track of the data sent to it but not stored in the memory of the mobile phone 104. In another embodiment, since the data is sent from the first device 102 to the mobile phone 104 in order of priority and the mobile phone 104 keeps track of the data sent to it but not stored in the memory of the mobile phone 104, the mobile phone 104 knows what data to retrieve from the first device 102 and in what order to retrieve the data. At block 318, the mobile phone 104 transmits the retrieved data to the backup server 108. In an embodiment, the data may be transmitted from the backup server 108 to a database 110 to be stored. At block 320, the memory used to store the retrieved backup data on the mobile phone 104 is freed.

If the mobile phone 104 lacks connectivity to the mobile phone access network at block 310, the method 300 progresses to block 322. If there is a new transmission of data from the first device 102 to the mobile phone 104 at block 322, the method 300 returns to block 306 where the new data is transmitted to the mobile phone 104 in order of priority. In an embodiment, a new transmission of data may occur on demand or periodically. If there is not a new transmission of data from the first device 102 to the mobile phone 104 at block 322, the method 300 returns to block 310 and checks for connectivity to the mobile phone access network.

Figure 4:
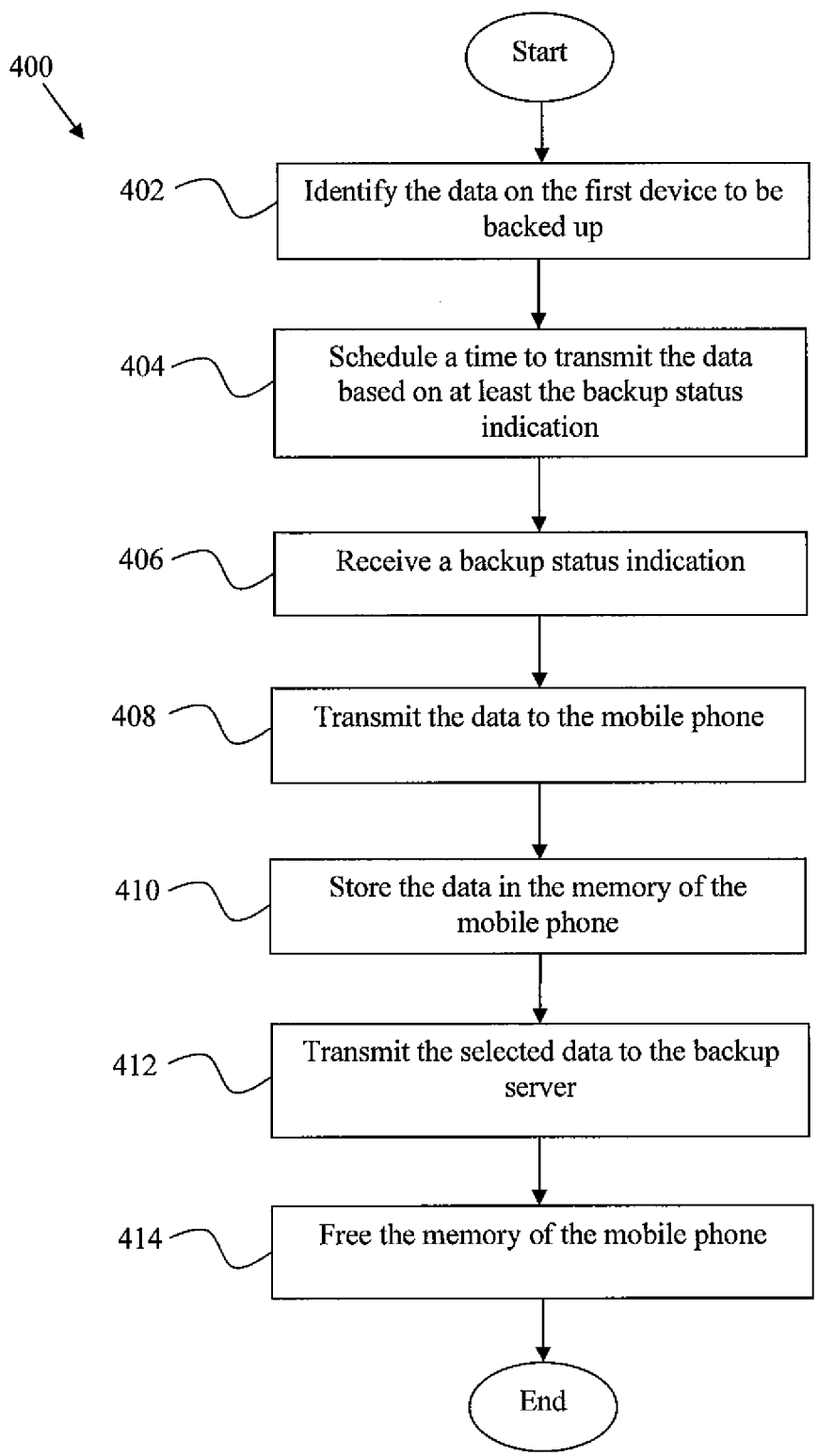
FIG. 4 is a flow chart illustrating a method according to a further embodiment of the disclosure.

FIG. 4 illustrates another method 400 of backing up data. The method 400 begins at block 402 where the data on the first device 102 to be backed up is identified. At block 404, a time is scheduled to transmit the data based on at least the backup status indication of the mobile phone 104. In an embodiment, the backup status indication of the mobile phone 104 corresponds to the remaining battery power of the mobile phone 104. At block 406, the first device 102 receives a backup status indication from the mobile phone 104. At block 408, the data is transmitted to the mobile phone 104. In an embodiment, the first device 102 may not transfer the data to the mobile phone 104 until the first device 102 receives the appropriate backup status indication. In an embodiment, the backup status indication provides an indication of what level of backup support the mobile phone 102 is prepared to provide. The backup status may indicate or be based on a remaining battery power of the mobile phone 102. For example, at block 404, the data might be scheduled to be transmitted periodically every ten minutes until the backup status indication from the mobile phone 104 drops to about 80% charged at which point the data might be scheduled to be transmitted less frequently, for example, periodically every twenty minutes. In another example, the scheduled time to transmit the data might be scheduled to be transmitted periodically every twenty minutes while the backup status indication from the mobile phone 104 has a value between about 80% and 65% charged, and when the backup status indication drops to about 65% charged the data might be scheduled to be transmitted still less frequently, for example, periodically once per hour. The ability to schedule times to transmit data based upon the backup status indication of the mobile phone 104 may help to prolong the battery life of the mobile phone 104 by increasing the time between backups as the battery level on the phone decreases.

At block 410, the data is stored in the memory of the mobile phone 104. At block 412, the data is transmitted to the backup server 108 via the wireless base station 106. In an embodiment, the data may be transmitted from the backup server 108 to a database 110 to be stored. At block 414, the memory used to store the backup data on the mobile phone 104 is freed.

In another embodiment, the backup status indication corresponds to enumerated or coded values, wherein the mobile phone 104 transmits the coded values to the first device 102 and the first device 102 conducts backups based on the coded values. For example, the coded values may include "no backup," "priority backup," "30 minute periodic backup," "15 minute periodic backup," and "on demand backup." Thus, when the first device 102 receives one of the coded values from the mobile phone 104, for example "priority backup," the first device 102 transmits the data in order of priority to the mobile phone 104. In another example, when the first device 102 receives the coded value of "15 minute periodic backup," the first device 102 transmits the data to the mobile phone 104 every 15 minutes.

Figure 5:
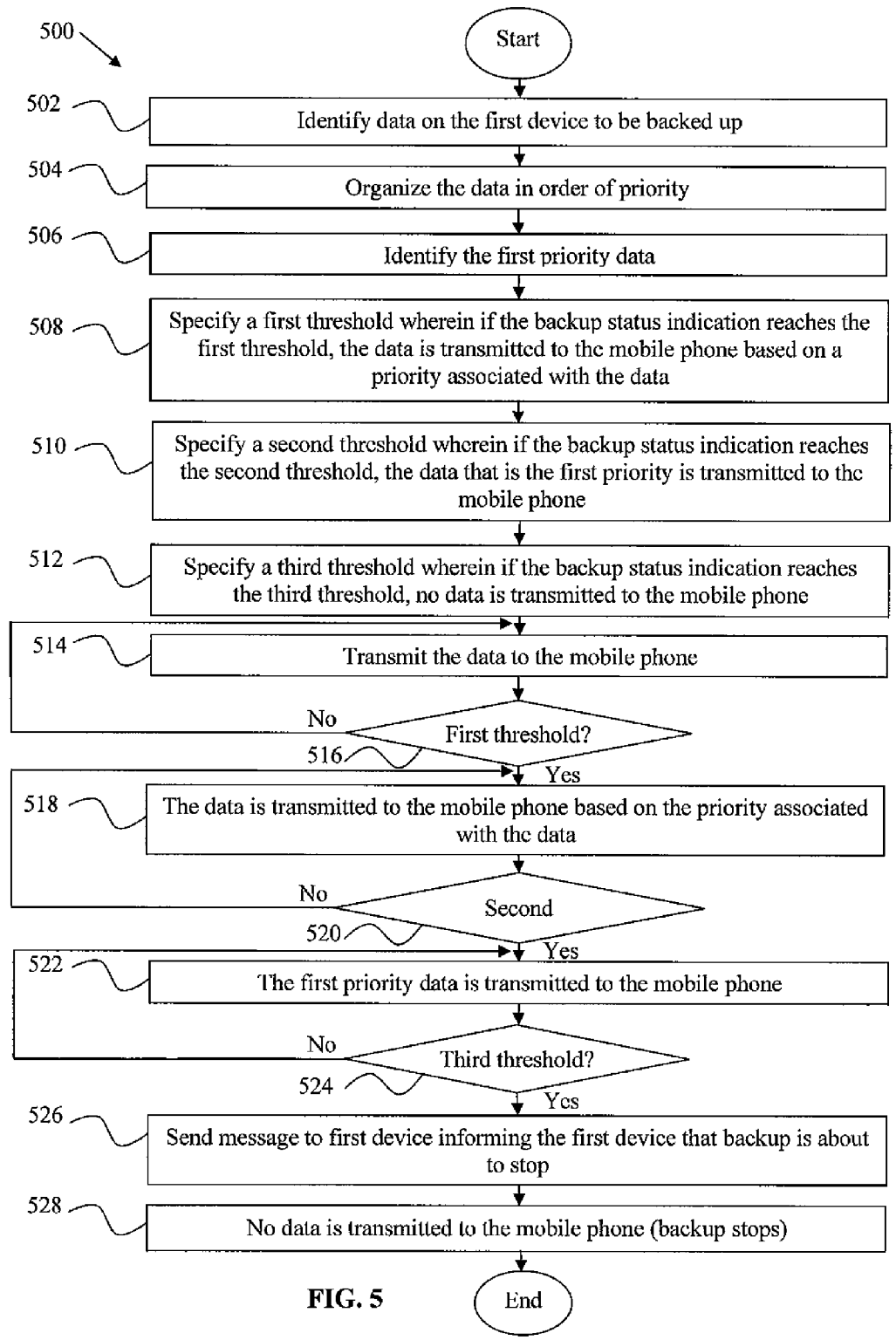
FIG. 5 is a flow chart illustrating a method according to yet another embodiment of the disclosure.

FIG. 5 illustrates yet another method 500 of backing up data. The method 500 begins at block 502 where the data on the first device 102 to be backed up is identified. At block 504, the data is organized in order of priority. At block 506, the first priority data is identified. In an embodiment, the first priority data corresponds to the data that is most important and consequently the data that is most important to have backed up. At block 508, a first threshold is specified, wherein if the backup status indication reaches the first threshold, the data is transmitted to the mobile phone 104 based on the priority of the data. In an embodiment, the mobile phone 104 sends the backup status indication to the first device 102. In another embodiment, the backup status indication corresponds to the percentage of the remaining battery power on the mobile phone 104. For example, at block 508, a percentage of the remaining battery power of the mobile phone 104 is specified such that when the backup status indication reaches the specified percentage, the data is transmitted to the mobile phone 104 based on the priority associated with the data.

At block 510, a second threshold is specified, wherein if the backup status indication reaches the second threshold, the data that is the first priority is transmitted to the mobile phone 104. For example, at block 510, a percentage of the remaining battery power of the mobile phone 104 is specified such that when the backup status indication reaches the specified percentage, only the first priority data is transmitted to the mobile phone 104.

At block 512, a third threshold is specified, wherein if the backup status indication reaches the third threshold, no data is transmitted to the mobile phone 104. For example, at block 512, a percentage of the remaining battery power of the mobile phone 104 is specified such that when the backup status indication reaches the specified percentage, no data is transmitted to the mobile phone 104. At block 514, the first device 102 transmits the data to the mobile phone 104. In an embodiment, there may be a manual override function, wherein a user of the mobile phone 104 may review battery status and select a priority level of data to send even when the remaining battery power of the mobile phone 104 exceeds one or more thresholds.

At block 516, if the backup status indication reaches the first threshold, the method 500 progresses to block 518 where the data is transmitted to the mobile phone 104 based on the priority associated with the data. If the backup status indication has not yet reached the first threshold at block 516, the method 500 returns to block 514 where the first device 102 continues to transmit the data to the mobile phone 104.

At block 520, if the backup status indication reaches the second threshold, the method 500 progresses to block 522 where the first priority data is transmitted to the mobile phone 104. If the backup status indication has not yet reached the second threshold at block 520, the method 500 returns to block 518 where the data is transmitted to the mobile phone 104 based on the priority associated with the data.

At block 524, if the backup status indication reaches the third threshold, the method 500 progresses to block 526 where a message is sent to the first device 102 informing the first device 102 that backup is about to stop. At block 528, no data is transmitted to the mobile phone 104 and backup ceases until the battery on the mobile phone 104 is recharged. If the backup status indication has not yet reached the third threshold at block 524, the method 500 returns to block 522 where the first priority data is transmitted to the mobile phone 104.

Although only three thresholds are illustrated in FIG. 5, one of ordinary skill in the art would realize that many more thresholds may exist. For example, as described in FIG. 4, there may be a number of thresholds, wherein when the backup status indication reaches the particular threshold, then the period of time between transmissions of the data might change. The ability to specify thresholds based on the backup status indication allows for greater power management of the mobile phone 104. Thus, thresholds may be set such that as the battery level of the mobile phone 104 begins to decrease, so does the backup activity, which allows the battery on the mobile phone 104 to last longer and potentially preserve some battery life for voice calls and other activity.

Figure 6:
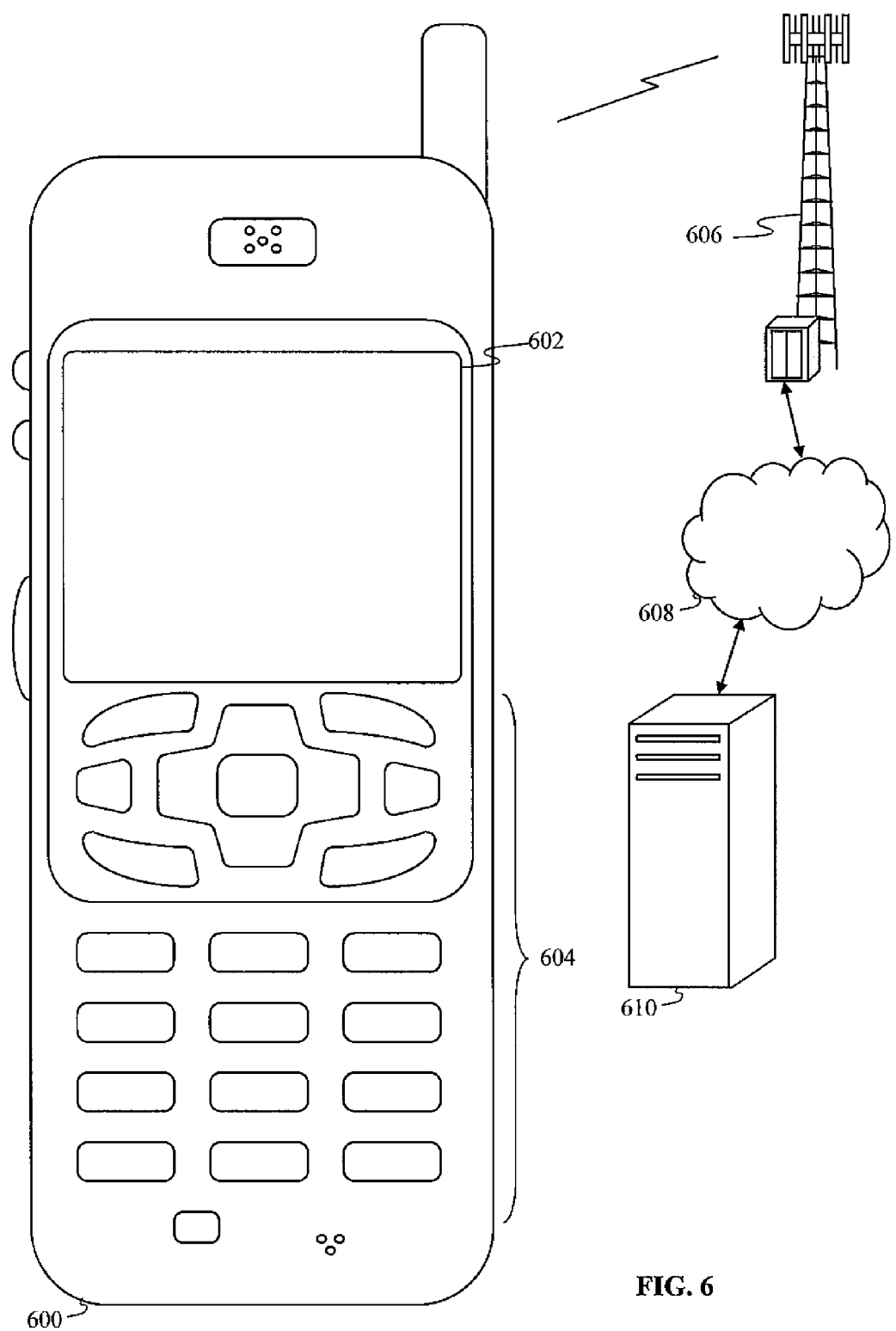
FIG. 6 is an illustration of a mobile phone according to an embodiment of the disclosure.

Turning now to FIG. 6, a handset 600 is shown which is operable for implementing aspects of the present disclosure, but the present disclosure should not be limited to these implementations. For example, in an embodiment, the handset 600 may be used to implement the mobile phone 104. Many suitable handsets combine some or all of these functions. In some embodiments of the present disclosure, the handset 600 is not a general-purpose computing device like a portable, laptop or tablet computer, but rather is a special-purpose communications device such as a mobile phone or a PDA. The handset 600 may support specialized work assignments such as inventory control, job control, and/or task management functions.

The handset 600 includes a display 602 and a touch-sensitive surface or keys 604 for input by a user. The handset 600 may present options for the user to select, controls for the user to actuate, and/or cursors or other indicators for the user to direct. The handset 600 may further accept data entry from the user, including numbers to dial or various parameter values for configuring the operation of the handset. The handset 600 may further execute one or more software or firmware applications in response to user commands. These applications may configure the handset 600 to perform various customized functions in response to user interaction. Additionally, the handset 600 may be programmed and/or configured over-the-air, for example, from a wireless base station, a wireless access point, or a peer handset 600.

The handset 600 may execute a web browser application which enables the display 602 to show a web page. The web page may be obtained via wireless communications with a cell tower 606, a wireless network access node, a peer handset 600 or any other wireless communication network or system. The cell tower 606 (or wireless network access node) is coupled to a wired network 608, such as the Internet. Via the wireless link and the wired network, the handset 600 has access to information on various servers, such as a server 610. The server 610 may provide content that may be shown on the display 602. Alternately, the handset 600 may access the cell tower 606 through a peer handset 600 acting as an intermediary, in a relay type or hop type of connection.

Figure 7:
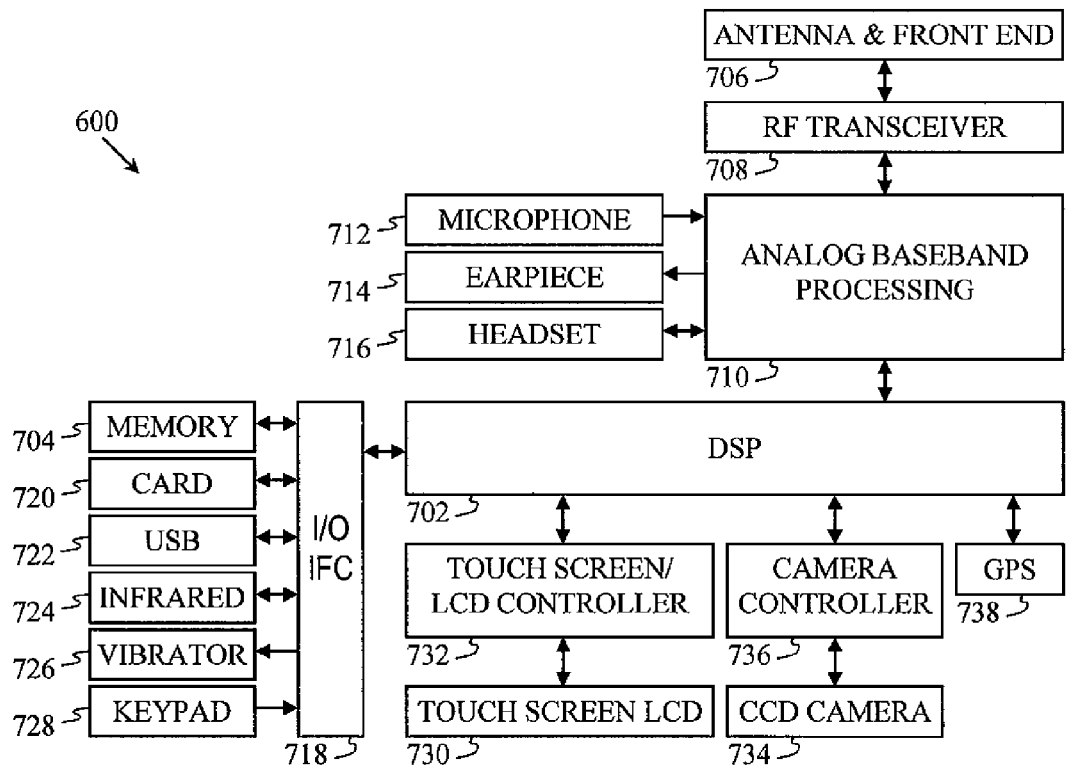
FIG. 7 is a block diagram of a mobile phone according to an embodiment of the disclosure.

FIG. 7 shows a block diagram of the handset 600. While a variety of known components of handsets 600 are depicted, in an embodiment, a subset of the listed components and/or additional components not listed may be included in the handset 600. The handset 600 includes a digital signal processor (DSP) 702 and a memory 704. As shown, the handset 600 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) interface 722, an infrared port 724, a vibrator 726, a keypad 728, a touch screen liquid crystal display (LCD) 730, a touch screen/LCD controller 732, a charge-coupled device (CCD) camera 734, a camera controller 736, and a global positioning system (GPS) sensor 738. In an embodiment, the handset 600 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the handset 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the handset 600 to send and receive information from a cellular network or some other available wireless communications network or from a peer handset 600. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions, a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF transceiver 708, portions of the antenna and front end unit 706, and the analog baseband processing unit 710 may be combined in one or more processing units and/or application specific integrated circuits (ASICs).

The analog baseband processing unit 710 may provide various analog processing of inputs and outputs, for example, analog processing of inputs from the microphone 712 and the headset port 716 and outputs to the earpiece speaker 714 and the headset port 716. To that end, the analog baseband processing unit 710 may have ports for connecting to the built-in microphone 712 and the earpiece speaker 714 that enable the handset 600 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments at least some of the functionality of the analog baseband processing unit 710 may be provided by digital processing components, for example, by the DSP 702 or by other central processing units.

The DSP 702 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example, in a code division multiple access (CDMA) technology application, for a transmitter function the DSP 702 may perform modulation, coding, interleaving, and spreading and for a receiver function the DSP 702 may perform despreading, deinterleaving, decoding, and demodulation. In another embodiment, for example, in an orthogonal frequency division multiplex access (OFDMA) technology application, for the transmitter function the DSP 702 may perform modulation, coding, interleaving, inverse fast fourier transforming, and cyclic prefix appending and for a receiver function the DSP 702 may perform cyclic prefix removal, fast fourier transforming, deinterleaving, decoding, and demodulation. In other wireless technology applications yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB interface 722 and the infrared port 724. The USB interface 722 may enable the handset 600 to function as a peripheral device to exchange information with a personal computer or other computer system. The infrared port 724 and other optional ports such as a Bluetooth interface or an IEEE 802.11 compliant wireless interface may enable the handset 600 to communicate wirelessly with other nearby handsets and/or wireless base stations.

The input/output interface 718 may further connect the DSP 702 to the vibrator 726 that, when triggered, causes the handset 600 to vibrate. The vibrator 726 may serve as a mechanism for silently alerting the user to any of various events such as an incoming call, a new text message, and an appointment reminder.

The keypad 728 couples to the DSP 702 via the input/output interface 718 to provide one mechanism for the user to make selections, enter information, and otherwise provide input to the handset 600. Another input mechanism may be the touch screen LCD 730, which may also display text and/or graphics to the user. The touch screen LCD controller 732 couples the DSP 702 to the touch screen LCD 730.

The CCD camera 734 enables the handset 600 to take digital pictures. The DSP 702 communicates with the CCD camera 734 via the camera controller 736. The GPS sensor 738 is coupled to the DSP 702 to decode global positioning system signals, thereby enabling the handset 600 to determine its position. In another embodiment, a camera operating according to a technology other than charge coupled device cameras may be employed. Various other peripherals may also be included to provide additional functions (e.g., radio and television reception).

Figure 8:
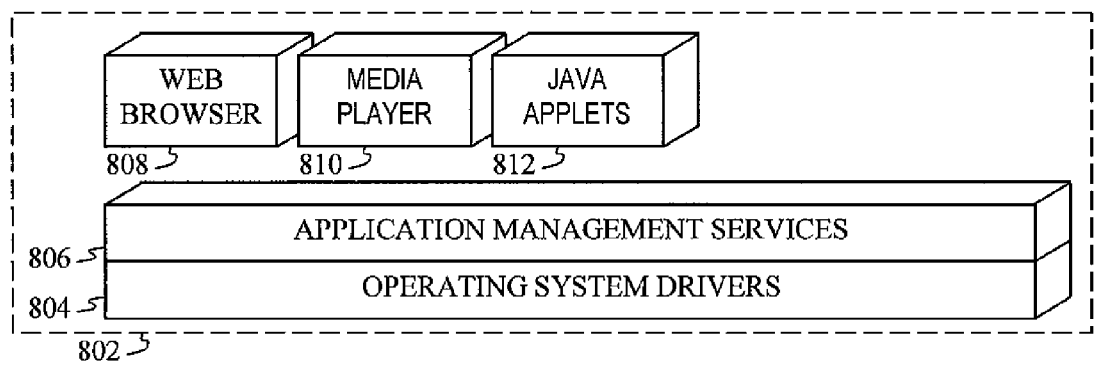
FIG. 8 is a block diagram of a software configuration for a mobile phone according to an embodiment of the disclosure.

FIG. 8 illustrates a software environment 802 that may be implemented by the DSP 702. The DSP 702 executes operating system drivers 804 that provide a platform from which the rest of the software operates. The operating system drivers 804 provide drivers for the handset hardware with standardized interfaces that are accessible to application software. The operating system drivers 804 include application management services CAMS") 806 that transfer control between applications running on the handset 600. Also shown in FIG. 8 are a web browser application 808, a media player application 810, and Java applets 812. The web browser application 808 configures the handset 600 to operate as a web browser, allowing a user to enter information into forms and select links to retrieve and view web pages. The media player application 810 configures the handset 600 to retrieve and play audio or audiovisual media. The Java applets 812 configure the handset 600 to provide games, utilities, and other functionality.

Figure 9:
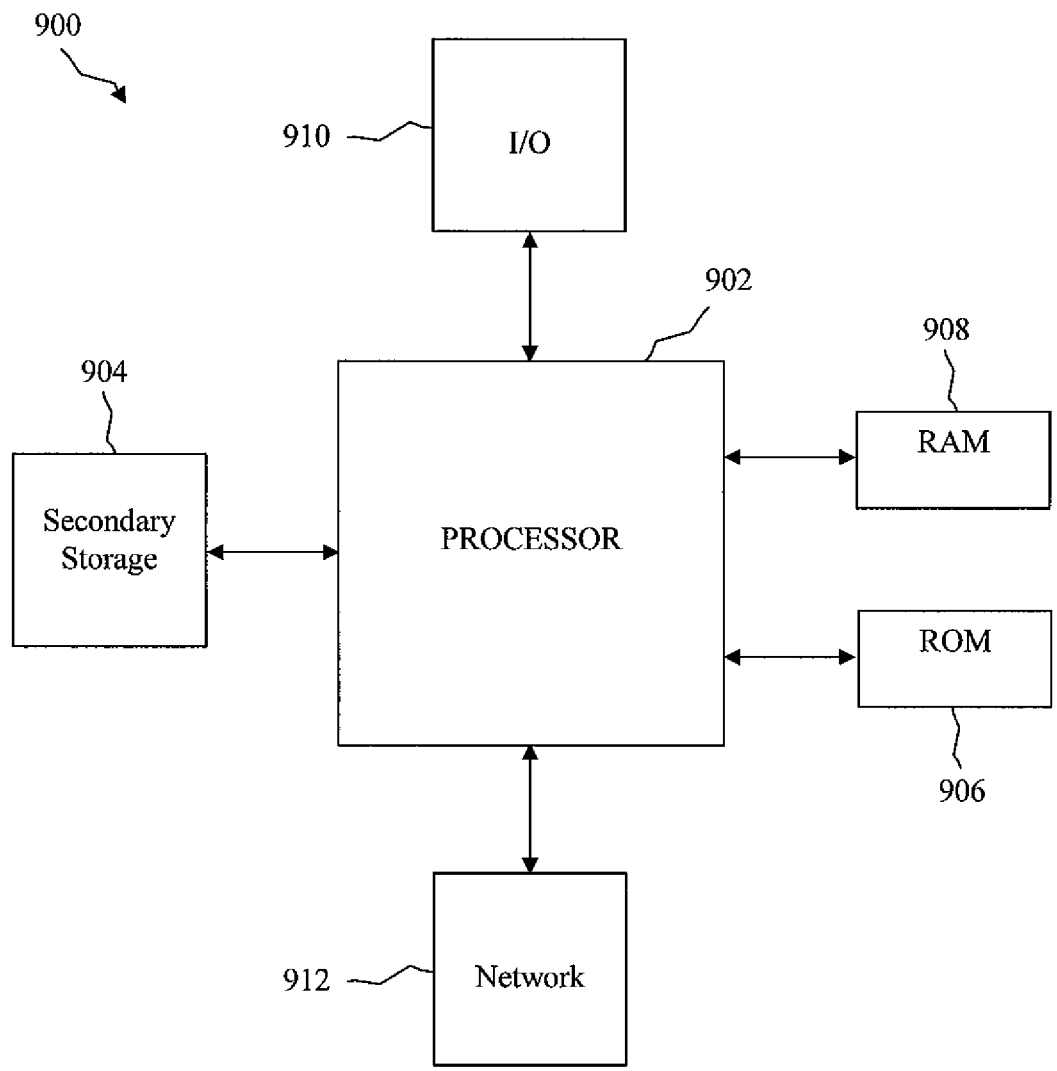
FIG. 9 illustrates an exemplary general-purpose computer system suitable for implementing the several embodiments of the disclosure.

Portions of system 100 described above may be implemented on any general-purpose computer with sufficient processing power, memory resources, and network throughput capability to handle the necessary workload placed upon it. For example, the first device 102 and the backup server 108 may be implemented on a general-purpose computer. FIG. 9 illustrates a typical, general-purpose computer system suitable for implementing one or more embodiments disclosed herein. The computer system 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage. The RAM 908 is used to store volatile data and perhaps to store instructions. Access to both ROM 906 and RAM 908 is typically faster than to secondary storage 904.

I/O devices 910 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 912 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), Worldwide Interoperability Microwave Access (WiMAX), and/or global system for mobile communications (GSM) radio transceiver cards, and other well-known network devices. These network connectivity devices 912 may enable the processor 902 to communicate with an Internet or one or more intranets. With such a network connection, it is contemplated that the processor 902 might receive information from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902, for example, may be received from and outputted to the network, for example, in the form of a computer data baseband signal or signal embodied in a carrier wave. The baseband signal or signal embodied in the carrier wave generated by the network connectivity devices 912 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 902 executes instructions, codes, computer programs, scripts which it accesses from hard disk, floppy disk, optical disk (these various disk based systems may all be considered secondary storage 904), ROM 906, RAM 908, or the network connectivity devices 912.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A data backup system, comprising:
    a first device configured to identify a data to transmit and to transmit the data at a selected rate, wherein the data is stored on the first device;
    a mobile phone in communication with the first device, and configured to transmit a battery power level of the mobile phone to the first device, to receive the data from the first device, to store the data in a memory of the mobile phone, and to transmit the data; and
    a backup server in communication with the mobile phone configured to receive the data from the mobile phone;
    wherein the mobile phone transmits the data when it has a wireless network connection, wherein the mobile phone defers transmitting the data when the mobile phone has no wireless network connection, and wherein the memory of the mobile phone is freed after transmitting the data to the backup server;
    wherein when the battery power level drops below a first threshold, the first device is configured to transmit the data at a first periodic rate;
    wherein when the battery power level indication drops below a second threshold, the first device is configured to transmit the data at a second periodic rate, and wherein the second periodic rate is less frequent than the first periodic rate; and
    wherein the data comprises a plurality of changes, each of the plurality of changes received by the mobile phone in a separate transmission, and wherein the memory of the mobile phone is freed upon a single transmission of the plurality of changes to the backup server.

2. The system of claim 1, wherein the first device is a general purpose computer.

3. The system of claim 1, wherein the data transmitted to the mobile phone is a changed data, and wherein the first device determines the changed data.

4. The system of claim 1, wherein the selected time to transmit the data is determined on demand using a manual override function initiated by a user of the mobile phone.

5. The system of claim 1, wherein a mobile phone access network is selected from a group consisting of CDMA, GSM, UMTS, and WiMAX.

6. A system of backing up data, comprising:
a data source configured to identify a backup data to transmit and to transmit the backup data at a plurality of selected rates, wherein the backup data is stored on the data source;
a mobile phone configured to receive the backup data from the data source outside of the mobile phone, to store the backup data in a memory of the mobile phone, and to transmit an indication of a battery power level of the mobile phone to the data source;
wherein the data source is configured to transmit the backup data at a rate chosen from the plurality of selected rates based on the indication of the battery power level dropping below one of a plurality of thresholds; and
wherein the backup data comprises a plurality of changes received by the mobile phone in a single transmission, and wherein the memory of the mobile phone is freed upon a separate transmission of each of the plurality of changes to a backup server.

7. The system of claim 6, wherein the mobile phone is further configured to transmit the backup data to a backup server via a mobile phone access network.

8. The system of claim 7, wherein the backup data is identified for transmission to the backup server based in part on a priority associated with the backup data received from the data source.

9. The system of claim 6, wherein the mobile phone is further configured to transmit the backup data to the data source.

10. The system of claim 1, wherein when the battery power level drops below a third threshold, the first device is configured to not transmit data.

11. The system of claim 1, wherein the first threshold comprises a first threshold battery power level, and the second threshold comprises a second threshold battery power level.

12. The system of claim 11, wherein the second threshold battery power level of the mobile phone is less than the first threshold battery power level of the mobile phone.

13. The system of claim 1, wherein the mobile phone stores the data in the memory of the mobile phone according to a priority associated with the data.

14. The system of claim 6, wherein the mobile phone is further configured to transmit a coded value to the data source indicating the data that the mobile phone can accept from the data source, and wherein the coded value comprises one or more of a no backup code, an on demand backup code, or a priority backup code.

15. The system of claim 14, wherein the coded value further indicates a periodic interval for receiving the data from the data source.

16. The system of claim 6, wherein the data source is further configured to determine a change in the backup data.

17. The system of claim 6, wherein the data source is a general purpose computer.

18. The system of claim 6, wherein the selected time to transmit the backup data is determined on demand using a manual override function initiated by a user of the mobile phone.

19. The system of claim 6, wherein a mobile phone access network is selected from a group consisting of CDMA, GSM, UMTS, and WiMAX.

20. The system of claim 1, wherein the mobile phone is further configured to transmit a coded value to the first device indicating the data that the mobile phone can accept from the first device, and wherein the coded value comprises one or more of a no backup code, an on demand backup code, or a priority backup code.

* * * * *